US007580142B2

(12) United States Patent
Van Den Tillaart et al.

(10) Patent No.: US 7,580,142 B2
(45) Date of Patent: Aug. 25, 2009

(54) METHOD, PRINTING APPARATUS, AND COMPUTER PROGRAM FOR PLACING A REQUESTED PRINT JOB IN A QUEUE

(75) Inventors: Robertus Cornelis Willibrordus Theodorus Maria Van Den Tillaart, Gemert (NL); Monica Maria Wilhelmina Mathea Roosen, Venlo (NL)

(73) Assignee: Oce-Technologies B.V., Venlo (NL)

( * ) Notice: Subject to any disclaimer, the term of this patent is extended or adjusted under 35 U.S.C. 154(b) by 629 days.

(21) Appl. No.: 10/201,907

(22) Filed: Jul. 25, 2002

(65) Prior Publication Data
US 2003/0020953 A1 Jan. 30, 2003

(30) Foreign Application Priority Data
Jul. 25, 2001 (NL) .................................... 1018634

(51) Int. Cl.
*G06K 15/00* (2006.01)
*G06F 15/16* (2006.01)
(52) U.S. Cl. .................................... 358/1.15; 358/1.16
(58) Field of Classification Search ................ 358/1.15, 358/1.13, 1.16, 403, 1.1, 1.8, 1.9, 1.18, 474, 358/448; 710/54; 399/80; 709/212, 213, 709/219
See application file for complete search history.

(56) References Cited

U.S. PATENT DOCUMENTS 5,327,526 A * 7/1994 Nomura et al. ............ 358/1.16
5,377,016 A   12/1994 Kashiwagi et al.
5,875,441 A * 2/1999 Nakatsuyama ................ 707/1
5,970,218 A * 10/1999 Mullin et al. ............... 358/1.15
5,983,051 A   11/1999 Mishima et al.
6,301,052 B1 * 10/2001 Carmeli ...................... 359/630
6,332,170 B1 * 12/2001 Ban .............................. 710/6
6,452,689 B1 *  9/2002 Srinivasan ................. 358/1.15
6,504,621 B1 *  1/2003 Salgado ..................... 358/1.16

(Continued)

FOREIGN PATENT DOCUMENTS

EP        0 469 865 A2    2/1992

(Continued)

OTHER PUBLICATIONS

Salgadao et al., Xerox Disclosure Journal, "Print Job Interruption Option with User Programmable Interrupt Breakpoint," vol. 21, No. 2, pp. 165-166, Mar./Apr. 1996.

*Primary Examiner*—Gabriel I Garcia
(74) *Attorney, Agent, or Firm*—Birch, Stewart, Kolasch & Birch, LLP (57) ABSTRACT

A method, printing apparatus and computer program for making documents are provided. In the method, a printing apparatus including a mechanism for placing an order for making a document in a queue, is used. The queue is capable of containing a number of jobs in a sequence in which they are to be executed. The method includes requesting at least one job for making a document on behalf of a user associated with the printing apparatus, receiving the at least one job by the printing apparatus, and automatically placing the at least one job in the queue, wherein when the user is identified at the printing apparatus, in response to which the at least one job ordered on behalf of the user is automatically placed at a predetermined location in the queue.

21 Claims, 4 Drawing Sheets

U.S. PATENT DOCUMENTS

| | | | |
|---|---|---|---|
| 6,762,853 B1 * | 7/2004 | Takagi et al. | 358/1.15 |
| 6,856,413 B1 * | 2/2005 | Roosen et al. | 358/1.15 |
| 6,894,792 B1 * | 5/2005 | Abe | 358/1.15 |
| 6,987,578 B2 * | 1/2006 | Alexander | 358/1.15 |
| 7,284,061 B2 * | 10/2007 | Matsubayashi et al. | 709/229 |
| 2001/0012122 A1 * | 8/2001 | Ueda | 358/1.15 |

FOREIGN PATENT DOCUMENTS

| | | |
|---|---|---|
| EP | 469865 A2 * | 2/1992 |
| EP | 0 873 007 A2 | 10/1998 |
| EP | 0 943 986 A1 | 9/1999 |
| EP | 1 107 568 A2 | 6/2001 |
| EP | 1107568 A2 * | 6/2001 |
| JP | 11-170627 | 6/1999 |
| JP | 11-272437 | 10/1999 |
| JP | 11-277852 | 10/1999 |
| JP | 2000-177212 | 6/2000 |
| JP | 2001-111743 | 4/2001 |

* cited by examiner

METHOD, PRINTING APPARATUS, AND COMPUTER PROGRAM FOR PLACING A REQUESTED PRINT JOB IN A QUEUE

The present application claims, under 35 U.S.C. §119, the priority benefit based on The Netherlands Patent Application No. 1018634 filed Jul. 25, 2001, the entire contents of which are herein fully incorporated by reference.

BACKGROUND OF THE INVENTION

1. Field of the Invention

The invention relates to a method, printing apparatus and computer program for making documents, wherein a user has great control over the document making process and has no need to search for his documents amongst a large pile of documents mixed with third-party documents.

2. Discussion of the Related Art

A method of making documents is known from European Patent Application No. EP 0 873 007. This known method is used in the described form in a multi-function printing system which has one or more queues. In particular, the known method is adapted to give priority to specific jobs on the basis of the location where the relevant orders are given, wherein the entire performance of giving priority and placing the jobs in one or more queues takes place via a programmed set of rules.

Multi-function printing systems or electronic printing systems of this kind typically comprising a receiving module (also termed an input image terminal (IIT)), a controller and a print engine (also termed an image output terminal (IOT)), may or may not be provided with a finishing module (for example a booklet maker). These modules can be combined in one housing but can equally be in the form of loose modules communicating with one another either via a tangible network or via the ether.

The printing system is often disposed at a central location in a user environment so that a number of users can use the system. This usually relates to systems which are relatively expensive, have numerous possibilities of making and finishing documents, are relatively fast, and provide a high print quality, all at a relatively low price per page. This can only be achieved if a large number of documents are made on the printing apparatus. Consequently, often, a large group of users can give jobs for making documents to the associated printing apparatus and they can also receive orders allocated to them by third parties, for example, faxes or e-mails addressed to a specific user, and print the same using a printing apparatus of this kind. Thus a job on behalf of a user means that this job can be given by a user or for that user. For this purpose, there are facilities for feeding jobs to the printing apparatus in various ways, for example, via a network or via the ether (print jobs, faxes, e-mails, etc.) or at the printing apparatus itself via a scanner or other receiving module (copying jobs). Since a printing apparatus of this kind can receive jobs from a number of different sources, while the printing module is frequently unable to process more than one job at a time, apparatus of this kind comprises a mechanism for placing a document making job in a queue. Each time a job is finished, the next job in the queue is carried out. A queue of this kind is normally compiled and processed on the basis of a FIFO concept (first in first out). In this way the jobs are processed on the arrival sequence basis.

However, it is frequently desirable to give specific jobs priority over other jobs. The known method discussed above makes provision for this. For this purpose, a distinction is made between jobs of a first user type and jobs of a second user type. If a job of the first user type arrives, it is placed at the back of the queue. If, however, a job of the second user type arrives, the job is placed at the head of the queue. This means that the second user's job will be executed as soon as the printing apparatus receives a following job from the queue for processing. In this way, the jobs of the second type of user, for example, a departmental secretary who must have the documents available immediately, will at all times have priority over jobs of the first user type, most of the users of the printing apparatus being of that type.

The known method for making documents discussed above has a number of disadvantages. In particular, users of the first type never know when their jobs will be processed. Not only do they have no idea on how long the queue is, but in addition it may be that many other jobs are given by others after they themselves have given a job, where the other jobs have priority over their own jobs. If a user of this kind goes to fetch his documents (a printing apparatus of this kind is frequently at a different location or in a different building) on the assumption that his job has been completed because he had already given sufficient time for the execution of his job, it may happen more than once that his documents are not (completely) ready. This means that the user of the first type has to proceed a second time to fetch the documents when they are ready, and this takes considerable time and also causes annoyance to the relevant user.

On the other hand, the second type of user in turn does not always know when his documents will be ready, because a subsequent user of this type may input a job with priority after the first user has done so. In short, the users, particularly those of the first type, have inadequate control of the performance of their jobs. One strategy to overcome this problem is to wait intentionally an extremely long time before fetching the documents, but this in turn has the disadvantage that the relevant documents are not available to the user for that entire period. A following disadvantage is that the user must search amongst a large stack of finished documents to find the documents made on the basis of his order. A printing apparatus of this kind is frequently provided with a delivery table on which the finished documents are simply stacked in the sequence in which they are printed. Searching for documents in this way still takes a considerable amount of the user's time, is also liable to mistakes, and hence causes annoyance. In addition, documents are frequently damaged by being located on a stack which users have to search through time and time again to find their own documents.

SUMMARY OF THE INVENTION

An object of this invention is to provide a user-friendly processing of the jobs, wherein the user has greater control over the making of his documents and has no need to search for his documents amongst a large pile mixed with third-party documents. To this end, a method in accordance with the present invention has been invented wherein the user is identified at the printing apparatus in response to which at least one job ordered on behalf of the user is automatically placed at a predetermined location in the queue.

In this method according to an embodiment, the user is identified at the printing apparatus at a certain time, i.e., his identity is input at the printing apparatus. In response to this, the job or jobs given on behalf of this user are selected in the queue and are automatically placed in a predetermined position in the queue, i.e., by the apparatus itself or at least by a system to which the apparatus belongs. In this way the user can group his jobs and place them in the queue at a location required by him. In this way the user gains more control over the processing of his jobs and he is in a position to place next to one another in the queue the jobs that he wants carried out immediately after one another. This gives him the advantage that the documents which correspond to these jobs will also be associated with one another in the stack of finished documents.

Identification of the user at the apparatus can take place in many ways. One possibility is to input at the printing apparatus a name, a personal code, or any type of personal information, so that it is clear to the printing apparatus which user is identified, whereafter the printing apparatus will place at a predetermined location in the queue the jobs given on behalf of that user. This information will frequently be input at the printing apparatus location, but it is also possible to input it remotely, for example, via a network or the ether. The information can also be given by the user himself or alternatively by someone acting in his name, for example, a secretary who on behalf of her boss (in this case the actual user) goes to fetch the documents belonging to the jobs given by him, or for example an operator of the printing apparatus acting for the user who has asked him to process his jobs within a specific period.

In European Patent Application EP 0 469 865, a method is disclosed with which the sequence of jobs in a queue can be influenced. In this method, jobs in the queue are sorted on the basis of specific characteristics of the job, for example, the size of the document corresponding to the job, the type of receiving material required, the type of finishing needed for the documents, and so on. Thus all jobs which require the document to be bound can be grouped in the queue because in this way more efficient use can be made of a binding station. In the conventional method, however, the user's uncertainty in respect of the processing of his jobs still applies.

In the conventional method, the user also has the possibility of manually sorting the jobs in the queue. This manual sorting, however, takes considerable time. The queues are frequently long and have to be run through in their entirety to ensure that all the required jobs have been selected. In addition, this method is very sensitive to errors, one's own jobs are frequently overlooked or by chance one or more jobs of a different user are selected and moved. This is very annoying to both users. In short, this form of sorting jobs is not user-friendly.

In one embodiment of the present invention, wherein a job at the head of the queue will be executed as next job, at least one job is placed at the head of the queue. In this embodiment, therefore, the user is certain that the job or jobs ordered on his behalf will be executed practically immediately as soon as his identity has been identified at the printing apparatus. This has the advantage that nobody proceeds to the printing apparatus unnecessarily in order to fetch documents. If the documents are not yet completely ready at the time that somebody wants them, then by identification of the user all jobs ordered on behalf of that user and still in the queue will immediately be placed at the head of the queue so that they can be processed practically immediately. An additional advantage is that at least these jobs are grouped and leave the printing apparatus in succession. This is a saving of time for the person collecting the documents associated with the jobs concerned.

In another embodiment of the present invention wherein the printing apparatus is a walk-up printer provided with an operation panel, the user is identified by the use of the operation panel. A walk-up printer is an apparatus which is frequently at a central location, wherein any arbitrary user (hence not just an operator) can give a job at the actual printer. A walk-up printer can process jobs given remotely, for example, via a network connection, and can process jobs given at the apparatus itself by the use of the operation panel. The latter, for example, comprises a VDU and a number of keys. A number of functions are often combined in a printer of this kind, for example, functions such as printing, copying, faxing, e-mailing, etc. For copying, an apparatus of this kind is provided, for example, with a scanner, which is either integrated in the printer housing or disposed as a loose module in the printer surroundings. In this embodiment of the method according to the invention, the user is identified at the printing apparatus itself, for example, by inputting a personal code or by the reading-out of a personal badge using the operation panel (in the latter case the use of the operation panel is restricted to holding the badge at a sufficiently short distance from the printer). This has the advantage that the person inputting the user's identity immediately sees the result thereof by the fact that the job (or a number of jobs) given on behalf of that user will be processed practically immediately, resulting in the delivery of one or more documents corresponding to these jobs by the print engine. This provides even greater control for the person identifying the user and consequently leads to greater user convenience.

In a further embodiment of the present invention, the user identifies himself by the use of the operation panel. In this embodiment it is the user himself who proceeds to the printing apparatus and identifies himself to the printing apparatus by the use of the operation panel. This can also be effected by inputting his name or one or other personal codes, or would alternatively be possible on the basis of other personal information, for example, information stored in a badge or chip, or recognition of the user's voice, his fingerprint, his iris or any personal feature. In this embodiment it is the user who at all times has maximum control over the processing of his jobs because he himself determines which jobs are to go where in the queue at the time that he is present at the printing apparatus.

In a following embodiment of the method according to the present invention, in which the queue contains a plurality of jobs given on behalf of the user, a group of jobs are selected from the plurality of jobs, which selected jobs are placed at a predetermined place in the queue. In this embodiment it is assumed that the queue contains more than one job and particularly a considerable number of jobs given on behalf of a specific user. In this situation it is not always desirable to the user, if he has identified himself (either himself or via a third person), for all the jobs that this user has given to be automatically placed at the predetermined place in the queue. For example, it is feasible that the user at a specific moment only wants those documents which are printed in color because it is precisely those documents that must be available for third parties quickly thereafter. In that case it is not desirable for the user to have to wait for these documents until the other jobs have been processed. The method according to this embodiment offers the possibility of making a selection from the plurality of jobs given on behalf of the user, whereafter only those selected jobs are moved in the queue in the manner as indicated hereinbefore. Possible embodiments are, in a first form, an automatic selection of the jobs given on behalf of the user on the basis of the user's identity, and a further automatic after-selection based on the operation of default settings. In a second embodiment, the after-selection could take place by giving the user an overview of the plurality of jobs given on his behalf, whereafter the user makes a manual selection from this restricted number of his own jobs, which are displayed to him for example via a display of the printing apparatus. The invention according to this embodiment means a further improvement of the user's control over the processing of his jobs and accordingly increases the user-friendly features of the printing apparatus.

In a further embodiment of the method according to the invention, the selected jobs are formed into a collective job which is placed at a specific location in the queue. In this embodiment all the selected jobs are bundled into a "superjob". This superjob is processed as one job but of course results in the same documents which would be made if the selected jobs were executed as separate jobs. The advantage of this embodiment is that the selected documents will be made in succession with great certainty without any possibility of another user disturbing the making of the relevant documents, for example, by inputting an interrupt job. The printing apparatus will normally not allow an interrupt job as long as the printer is occupied in finishing a specific job, whereas an interrupt job is frequently admitted between the finishing of loose jobs. The method according to this invention thus further meets the requirement of greater control over the processing of the jobs and elimination of the need to sort the documents after they are made.

In yet another embodiment of the method according to the present invention, in which a job at the head of the queue will be executed as the next job, the collective job is placed at the head of the queue. In this embodiment, the documents of the relevant jobs formed into the superjob are made by the printing apparatus practically immediately after the user has identified himself, for example, by the user himself at the actual printing apparatus.

In an alternative embodiment, the selected jobs are not placed in the queue in the form of a collective job but the jobs belonging to the group of selected jobs are placed in the queue in a specific sequence, where the specific sequence is equal to the relative mutual position that the jobs had in the queue before the user was identified at the printing apparatus.

In this embodiment, although the selected jobs are grouped in the queue and placed at a predetermined location, they remain as jobs which are to be performed separately and which in principle will be performed in the sequence in which the user gave them. The method according to this embodiment is flexible in respect of the processing of the selected jobs. Thus in this embodiment it is possible that the user, while awaiting the production of his documents, will allow an interrupt job (for example, because he wants to make a good impression on someone who wants a job processed in the interim). It could also be that the person who has selected the jobs decides not to wait for all the documents any longer while awaiting their performance (for example, because he has been summoned immediately to appear somewhere else). He could then choose to stop printing after the current job. The remaining jobs could then be put back in the queue, for example, to their original location.

In one embodiment, the group of selected jobs contains all the jobs in the queue which have been given on behalf of the user. In this embodiment, the entire queue is automatically searched for jobs given on behalf of the user whereafter these jobs are selected and are placed at a predetermined location in the queue. This embodiment has the advantage that it is simple to perform by the user and gives the result that all the jobs in the queue are executed practically immediately.

In an alternative embodiment of the method according to the invention, the jobs belonging to the group are selected from the plurality of jobs on the basis of an adjustable selection criterion. In this embodiment, the user, or at least the person identifying the user at the printing apparatus, can choose which of the given jobs must be selected and moved in the queue. Thus it is often possible that the user at a specific time wants just a specific type of job from a large group of jobs to be processed immediately. A user could, for example, select just those jobs which will result in bound documents because he knows that it is precisely those documents that must be available within a very short time, or for example just third-party reports addressed to him (faxes, e-mails, etc.) because he is expecting an important report.

In a further embodiment of this method, the selection criterion is selected from the group including the processing time of a job, the type of receiving material, the type of document, type of document finishing, color of the information for printing, and residence time of the job in the queue. Examples of these criteria are respectively: processing just those jobs which can be executed within two minutes, processing just those jobs with which overhead sheets are used, processing only those jobs which result in the production of external post, processing only those jobs which result in bound documents, processing only those jobs which result in color documents, processing only those jobs which are in the queue for longer than three hours. In this way the user has more control over the processing and yet can in simple manner make use of the method according to the invention.

The method according to the present invention can be applied simply to existing printing devices which operate with one or more queues. For this purpose it is only necessary to install the computer software by the use of which the method according to the invention can be performed with a printing apparatus, for example, in the printing apparatus controller. Software of this kind can be carried by a computer program element, for example, a floppy disk, a CD, or a code which can be loaded via a network. Any existing computer programming language may be used to implement the present invention.

For the application of the method according to the invention, it is important that the job selected and placed in a predetermined location in the queue should be so labeled that it can be identified as being given on behalf of the corresponding user. In the absence of such labeling for a specific job, such job cannot in principle be selected on the basis of the user's identity.

The present invention can also be applied to a queue in combination with a mailbox at the printing apparatus, for example, as known from European Patent Application EP 0943 986 by the same Applicant, the entire contents of which are herein fully incorporated by reference. A mailbox contains a personalized letterbox for each user. The user can choose for a job to be placed in the queue (as an automatic print job) so that it will be processed immediately when the printing apparatus is available, or he can choose to place the job in his own letterbox (as an interactive print job). This letterbox contains only jobs given on behalf of the corresponding user. The jobs in this letterbox are processed only if the user gives a specific command, for example, via the printer operation panel.

Using the method according to the present invention, it is possible, by identifying the user, for both the jobs from the queue and the jobs in this user's letterbox, to be placed at a predetermined place in the queue.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained in detail with reference to the following figures.

DETAILED DESCRIPTION OF THE PREFERRED EMBODIMENTS

Figure 1:
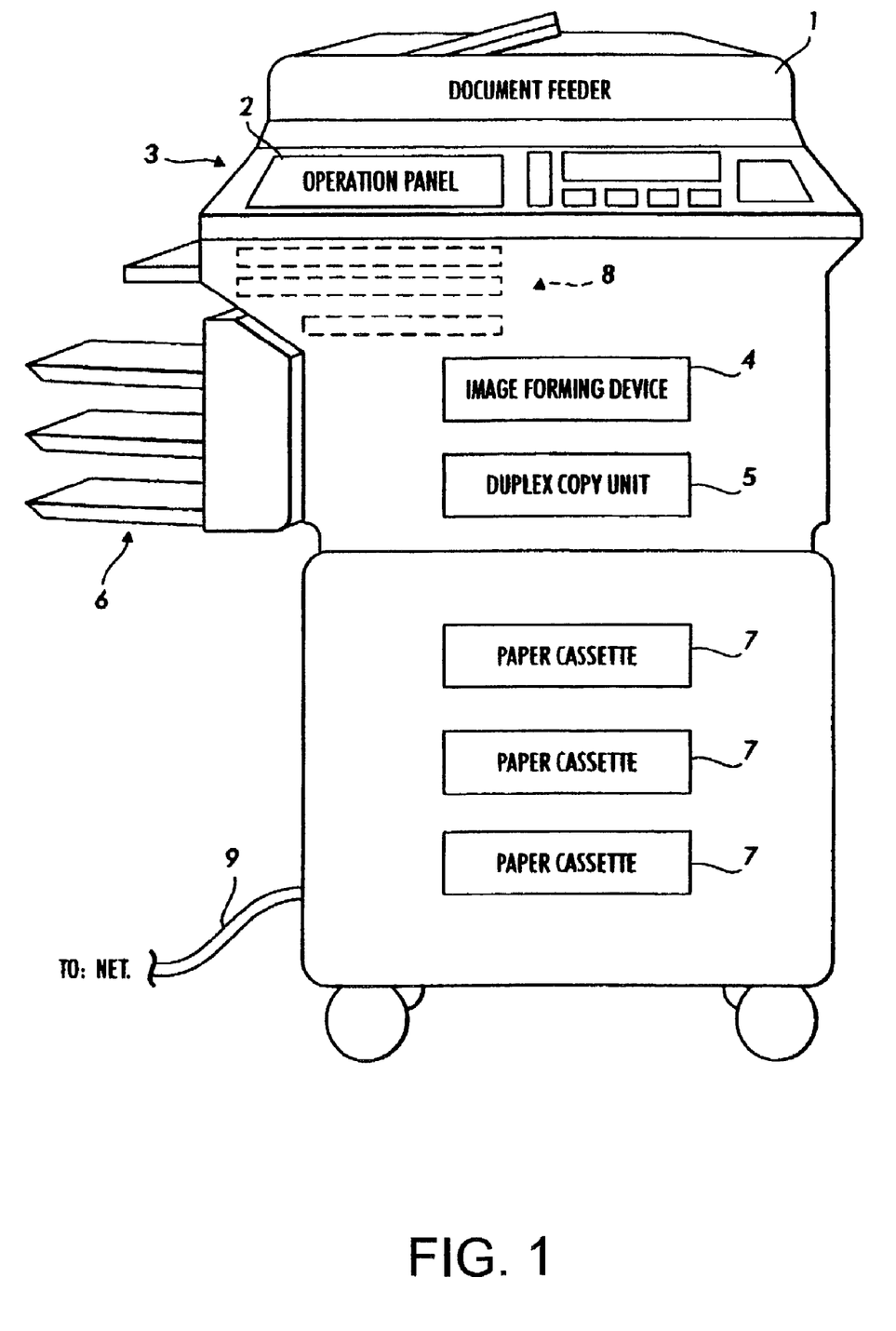
FIG. 1 is a side elevation of a printing apparatus according to the present invention.

FIG. 1

FIG. 1 is a conventional digital multi-function printing apparatus in which the present invention may be practiced. As illustrated, the printing apparatus comprises an automatic document feeder 1 and an operation panel 2 including a VDU (not shown). As soon as the required conditions have been input by a user, using the operation panel 2, the document feeder 1 will automatically move a document, particularly a first sheet of paper, from a stack which as in its entirety forms the document, to a predetermined position of a scanner 3. This sheet of paper, on which there is an original image for copying, will then be read. As soon as this has been done, the document will be moved again, back to its initial position in the document feeder 1 in one embodiment. The second sheet of the document can then be read. In this way, a document, even if it consists of a stack of loose sheets, can be automatically read in its entirety.

In this example, the scanner 3 illuminates each sheet of paper (or any material situated at the predetermined scanner reading location) and the reflected light is converted to a corresponding electrical signal using a CCD (charge coupled device) image sensor (not shown). An image forming device 4, which is actuated on the basis of the electrical signal, then forms the corresponding image on a receiving material. In this embodiment, the image forming device 4 comprises an electro-photographic process in which a charge image is created on a photoconductor by image-wise exposure of the charged photoconductor by means of an LED array. The use of this type of process, however, is not an essential part of the present invention and could, for example, equally be replaced with a thermal process, a direct electrical process, an ink jet process, or any other known image forming process.

The receiving material is located in one of paper cassettes 7, from which a sheet of paper, or another receiving material in the associated cassette, is fed to the image forming device 4. Here the image is transferred to the sheet of paper. A duplex copy unit 5 is also present in the printing apparatus and by means of this a sheet of paper printed on one side is turned over by the image forming device 4 so that the other side of the sheet can also be provided with an image. In this way, a double-sided copy can be formed. The printed paper is fed from the printing apparatus and deposited on one of the delivery surfaces of a delivery station 6.

In this example, the printing apparatus comprises a number of different application units 8, namely a first unit which makes the printing apparatus suitable for copying, a second unit which makes the printing apparatus suitable for printing, and a third unit which makes the apparatus suitable for faxing (receiving and sending of reports). Each of these units can make use of the operation panel 2, the image forming device 4, the duplex unit 5, the paper cassettes 7 and the delivery station 6.

When the printing apparatus is used as a copying machine, a user will normally proceed to the apparatus, where he places an original for copying in the document feeder 1, inputs the required settings via the operation panel 2, and removes the copied documents from the delivery station 6. If the printing apparatus is used as a printer, a user, frequently from a workstation (not shown) connected to the printing apparatus, will transmit to the printing apparatus in the form of a digital file a document which is required to be printed. In this embodiment, the user can select whether he wishes to have the file printed automatically or whether printing should not take place until after the user has performed an operation at the printing apparatus itself, for example, by giving the order to print the file via the operation panel 2. In the former case, the file for printing will be placed in a queue and this file will be printed as soon as the queue has been sufficiently processed. In the second case, the file goes to a personalized letterbox. The file will not be printed until the user (or another authorized person) indicates at the printing apparatus that he wants the file printed. A job of this kind can be input via the operation panel 2. If the printing apparatus is used as a fax, then the reception of faxes will take place automatically, again via cable 9. To send faxes, a user must input the required settings (e.g. the fax number) at the apparatus, via the operation panel 2, and must place the original for faxing in the document feeder 1.

A method for making documents according to the invention can be implemented in a printing apparatus of the kind shown in FIG. 1. However, the application of the invention is not restricted to the above-described printing apparatus, and is possible in other types of printing apparatuses. One embodiment of a printing apparatus adapted to the performance of the method according to the invention is explained in detail in FIGS. 2, 3 and 4.

Figure 2:
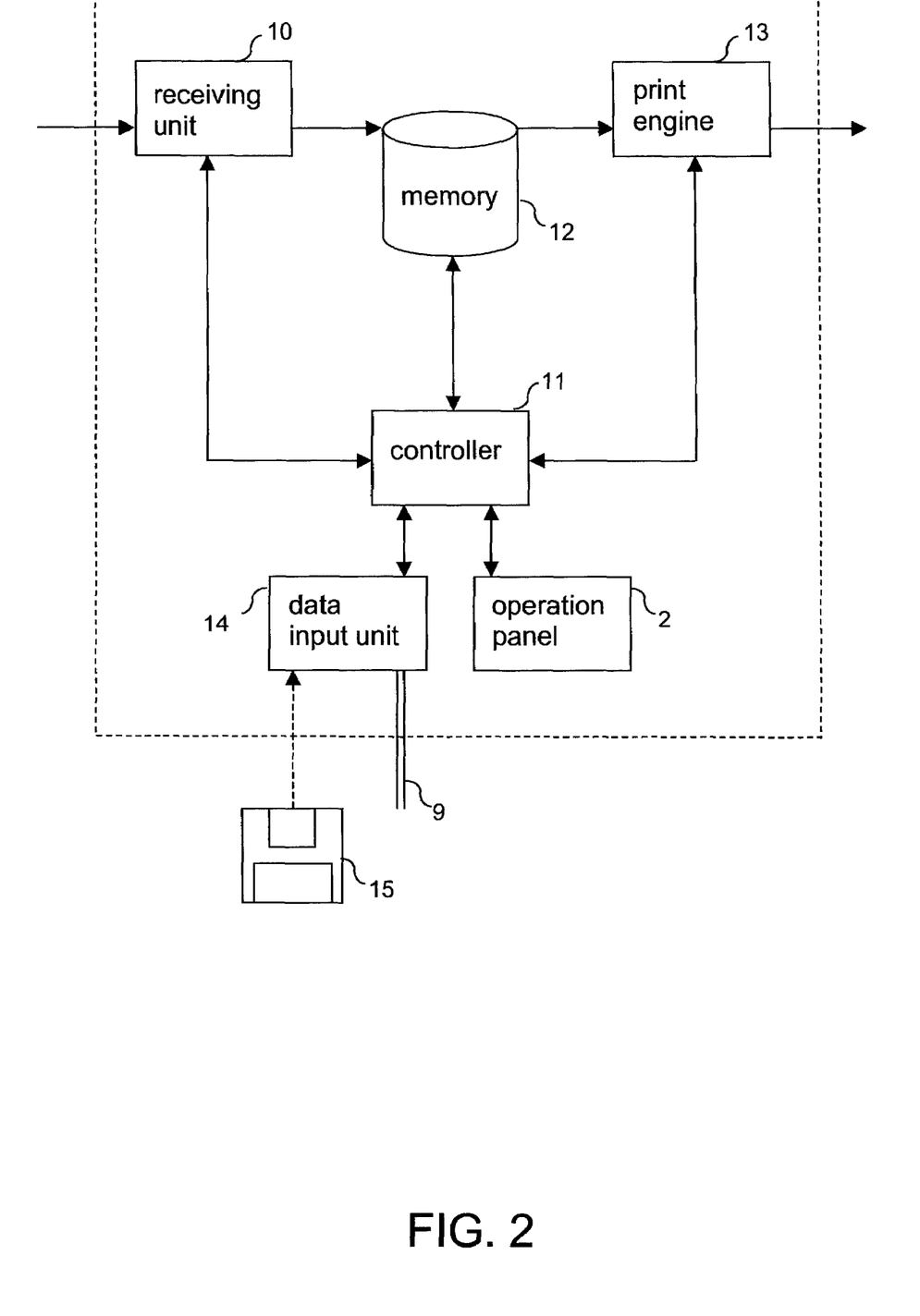
FIG. 2 is a diagram showing some parts of a printing apparatus according to an embodiment of the invention.

FIG. 2

FIG. 2 is a diagram showing some parts of a printing apparatus according to one embodiment of the invention. As illustrated, the printing apparatus comprises a receiving unit 10 for receiving image information, a memory 12 for the storage of data and a print engine 13 for printing an image on a receiving material. The receiving unit is adapted to receive image data, for example, data sent via a network from a workstation to the printing apparatus, or data which is transmitted to the receiving unit 10 via a scanner forming part of the printing apparatus.

The printing apparatus of the present invention is also provided with a controller 11 which also has the task of storing in an orderly manner in the memory 12 of the printing apparatus the image information received by the receiving unit 10. In this embodiment, all the image information associated with one job given on behalf of a user (for example, a user himself who wishes to make a copy or have a document printed, or a user who has received a fax or e-mail on this printing apparatus), is stored in a queue in the memory 12. The controller 11 in each case passes the information associated with the job at the head of the queue to the print engine 13 when the latter is ready to make a document. The received jobs are processed by the printing apparatus one by one in this way. Unless other steps are taken, this processing takes place on the basis of first-in first-out, i.e., the first job received by the receiving unit 10 is also the first job to be processed by the printing unit.

The printing apparatus of the present invention is also provided with an operation panel 2 directly connected to the controller 11. In this way a user can influence the process of making documents with the printing apparatus at the actual printing apparatus itself. The printing apparatus also comprises a data input unit 14 which in this embodiment is adapted to receive data other than image information. Such data may, for example, be a computer program code with which specific methods of the present invention can be performed on the apparatus. Thus it is possible to load into an existing printing apparatus provided with a data input unit of this kind a program code so that such apparatus becomes suitable for performing the method according to the present invention. Data could be delivered on a scannable support, for example, a floppy disk 15, a CD, a magnetic tape, and so on. However, it is also possible to feed this data via a network (e.g., through a cable 9 or network connection) and load it into the printing apparatus.

Figure 3:
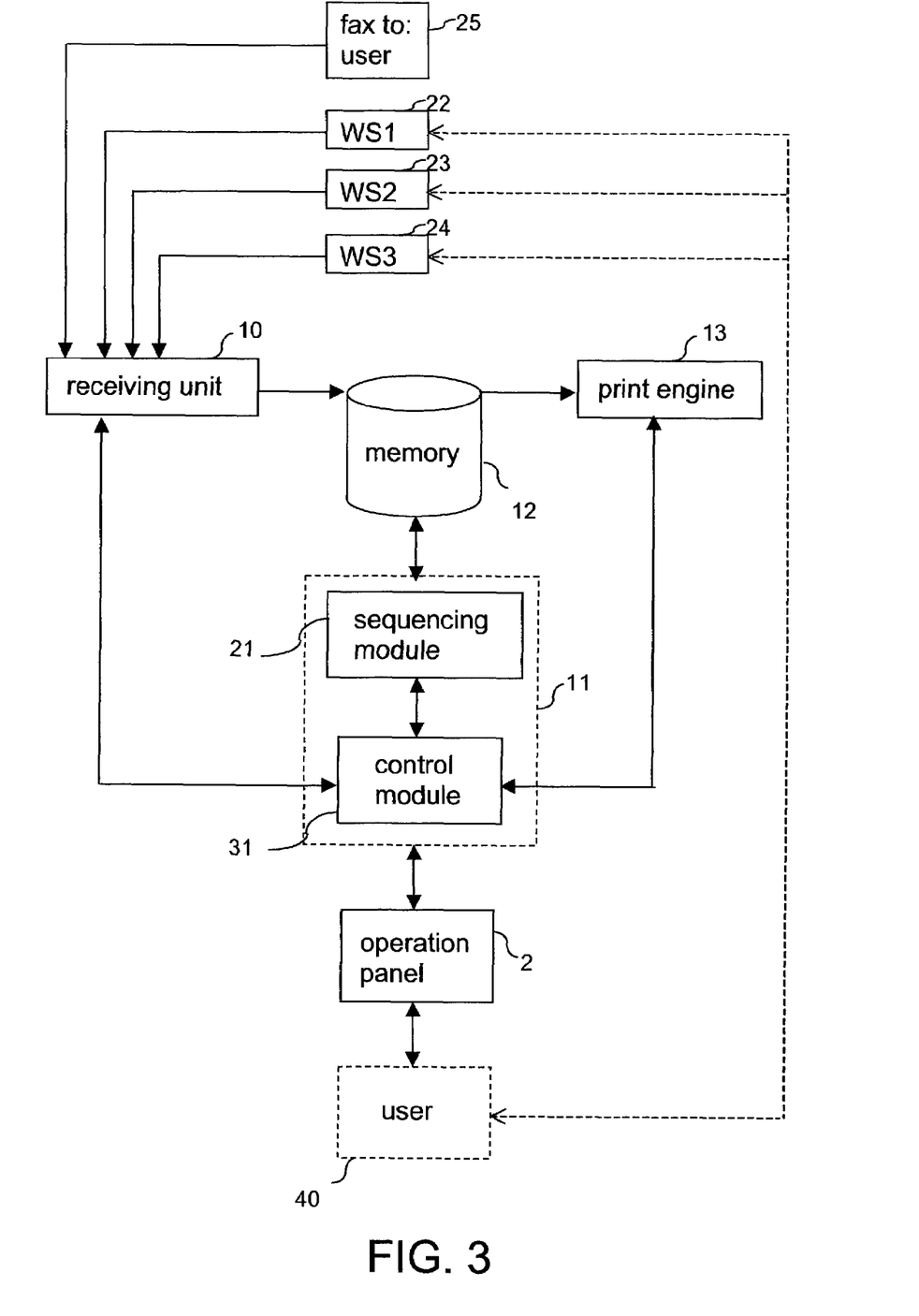
FIG. 3 is a diagram showing an information processing system to which the printing apparatus of FIG. 2 belongs.

FIG. 3

FIG. 3 is a diagram showing an information processing system according to an embodiment of the present invention, of which the printing apparatus of FIG. 2 forms part. In this example, further details are given of the controller 11 of the printing apparatus in FIG. 2. The controller 11 of this printing apparatus according to the present invention comprises a basic control module 31 together with a sequencing module 21. The sequencing module 21 is adapted automatically to determine the sequence of jobs in the queue and, if required, adapt it later.

It will be clear from this example that the receiving unit 10 is connected to a number of workstations, namely, WS1 (22), WS2 (23), WS3 (24) and a fax module 25. From each of these workstations a user 40 of the system can give an order for a document to be made by the printing apparatus. The user can also receive a fax via the fax module 25. Of course there can also be any number of users. In a typical office environment with a central printing apparatus of this kind, each workstation will have its own user and in principle there will be one fax module available for the entire group of users. In a practical embodiment, the receiving unit 10 is connected to at least some tens of workstations. Orders for making documents on behalf of the user can be given from any workstation and via the fax module 25.

As described in FIG. 2, the jobs are placed in a specific sequence in the memory 12 by the controller 11 using the sequencing module 21. In this embodiment, this sequence is determined by the sequence of reception of the jobs by the receiving unit 10. A user 40 who at a specific moment requires the documents belonging to jobs which have been given on his behalf, for example, by the user himself via a workstation WS1 or by a third party via the fax module 25, can proceed to the printing apparatus, where he identifies himself at the printing apparatus by inputting a personal code or predetermined user-authenticating information via the operation panel 2. In this case the user can also indicate whether he wishes to have carried out directly all the jobs which are in the queue at that time or whether he wishes to select just specific jobs in front of those. If he selects the first option, then the controller 11, using the sequencing module 12, will select all the jobs which have been given on behalf of the user 40 and place them at the top of the queue. In this embodiment, the selected jobs are placed in the queue in the form of one collective job. As soon as the print engine 13 is available to make the documents, the controller 11 will send the collective job to the print engine 13. This is done in such a manner that all the sub-jobs of the collective job (i.e., the original jobs as sent by the user 40 or by a third party for this user to the printing apparatus) are executed in sequence by the print engine 13. This prevents a subsequent user from interfering with the processing of the jobs, for example, by identifying himself in the same way at the printing apparatus during the processing of the first-mentioned set of jobs, whereafter precisely all those jobs given on behalf of that next user would be processed with priority.

In this way, a user who proceeds to the printing apparatus (or, for example, third party so doing on behalf of the user) has good control over the processing of his jobs. As soon as he has identified himself at the printing apparatus jobs given on his behalf are automatically put at the head of the queue and hence processed with priority.

It is incidentally immaterial to the invention how the user's identity is input at the printing apparatus. A variety of different techniques can be used to enter the user's identity information or other predetermined user-authenticating information. For instance, as described, this can be done using the operation panel which is a direct component of the printing apparatus, but it could also be via a network. The latter is becoming increasingly more likely since in many digital printers, an operation is effected from a controller module which is not integrated in the printer but is at a short (or if required considerable) distance from the actual printer, or because the operation is increasingly being effected from workstations which, for example, have a virtual operation panel available.

Figure 4:
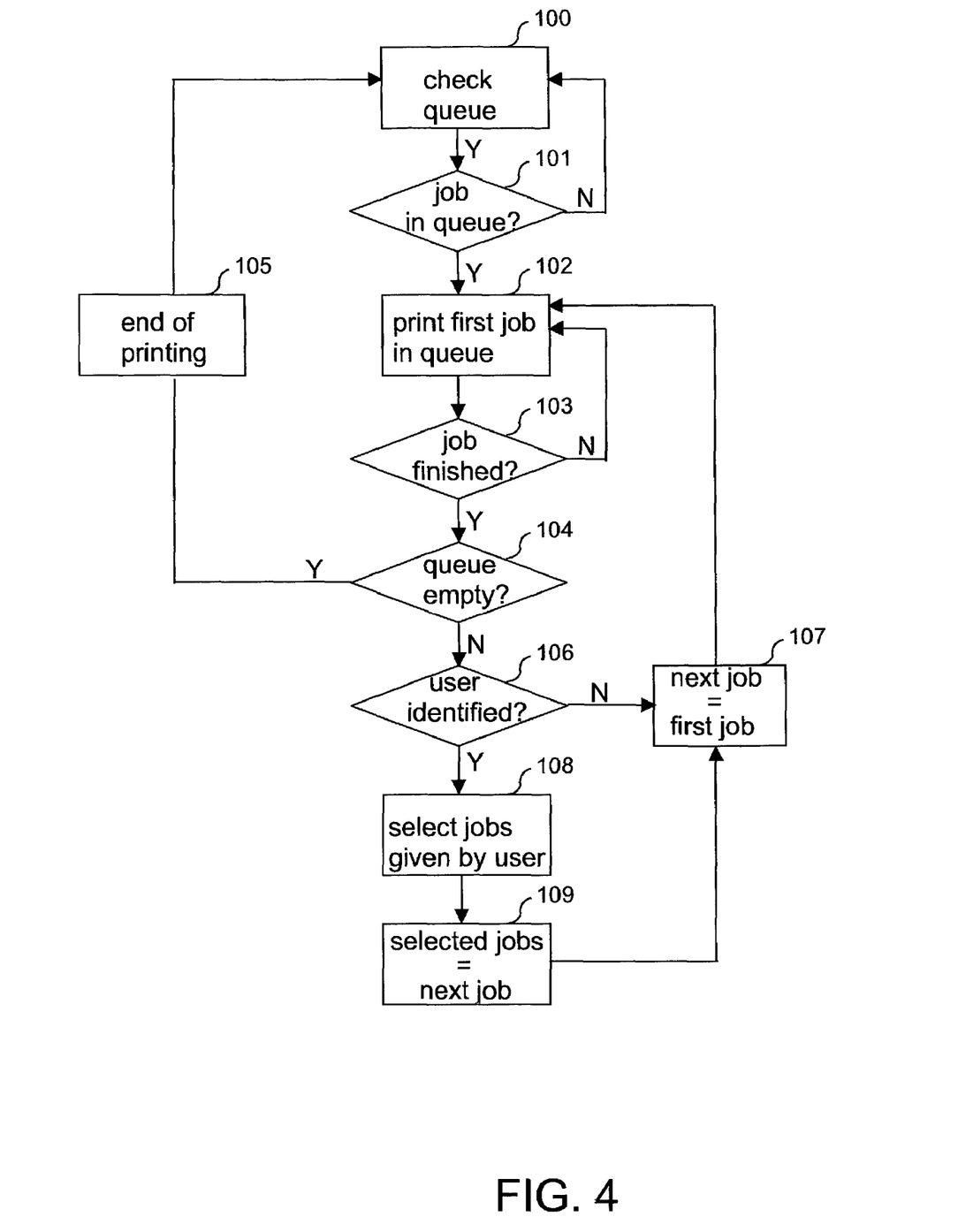
FIG. 4 is a flow chart showing one embodiment of a method of making documents according to an embodiment of the present invention.

FIG. 4

FIG. 4 is a flow chart showing an embodiment of a method of making documents according to the present invention. The processing steps of FIG. 4 may be implemented in the apparatus and system of FIGS. 2 and 3. In one embodiment, this flow chart belongs to a central printer which is used 24 hours per day.

Referring to FIG. 4, this apparatus in step 100 checks the contents of the queue in the printer memory at regular intervals, typically after an interval of ten seconds. Step 101 checks whether the queue contains a job which should be processed by the printer, more particularly, a job for making one or more documents. If the queue does not contain any job, then step 100 is carried out again. If there is a job in the queue, then the first job in the queue is processed by the printer in step 102. After a specific interval, typically ten seconds, step 103 checks whether the job is finished. If not, processing is continued in step 102. If the job is finished, step 104 checks whether the queue is empty. If so, step 105 follows and printing is terminated. Step 100 then follows. If the queue is not empty at step 104, step 106 checks whether a user has identified himself at the printer during the processing of the preceding job. If not, step 107 places the next job in the queue at the head of that queue. This job will then be processed in step 102.

If a user has identified himself during the printing of the preceding job (for example because a person has input the relevant user's code via the operation panel) at step 106, then in this embodiment all the jobs in the queue which been given on behalf of that user are selected in step 108. These jobs are then converted in step 109 to a collective job which is placed as the next job in the queue. This collective job is put at the head of the queue in step 107, whereafter this job is processed in step 102 by making the corresponding documents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of making documents with a printing apparatus including a mechanism for placing a requested job for making a document in a queue, wherein the queue contains a number of jobs in a sequence in which they are to be executed, the method comprising:
   requesting at least one job for making a document on behalf of a user associated with the printing apparatus, the at least one job having attached thereto a label adapted for identification, by the printing apparatus, of the user on which behalf the at least one job has been requested;
   receiving the at least one job by the printing apparatus; and
   automatically placing, by the printing apparatus, the at least one job in the queue for automatic printing without user intervention,
   wherein the method further comprises, before the at least one job is automatically printed:
     inputting a user identification by the user at the printing apparatus, and
     identifying the user by the printing apparatus by means of the input user identification based on the label of the at least one job,
     wherein the step of automatically placing includes automatically placing the at least one job at a predetermined location in the queue in order to be automatically printed as a next job.

2. The method according to claim 1, wherein a job at the head of the queue is executed as a next job, wherein the at least one job requested on behalf of the user is placed at the head of the queue in response to the user identification.

3. The method according to claim 1, further comprising:
   inputting the user identification via one of an input keypad and a badge reader.

4. The method according to claim 1, wherein the user identifies himself by using an operation panel of the printing apparatus.

5. The method according to claim 1, wherein the queue contains a plurality of jobs requested on behalf of the user, wherein a group of jobs is selected from the plurality of job on the basis of an adjustable selection criterion, the selected jobs being placed at a predetermined location in the queue.

6. The method according to claim 5, wherein the selected jobs are formed into a collective job which is placed at a specific location in the queue.

7. The method according to claim 6, wherein a job at the head of the queue is executed as the next job, wherein the collective job is placed at the head of the queue.

8. The method according to claim 5, wherein the jobs belonging to the group of selected jobs are placed in a specific sequence in the queue, where the sequence is equal to a relative mutual position that said jobs had in the queue before the user was identified at the printing apparatus.

9. The method according to claim 5, wherein said group contains all the jobs in the queue which have been requested on behalf of the user.

10. The method according to claim 5, wherein the selection criterion is selected from the group including: processing time of a job, the type of receiving material, the type of document, the type of document finishing, color of information for printing, and a residence time of the job in the queue.

11. A computer readable medium encoded with a computer program, for making documents with a printing apparatus including a mechanism for placing a requested job for making a document in a queue, wherein the queue contains a number of jobs in a sequence in which they are to be executed, the computer program comprising computer-executable instructions for:
   requesting at least one job for making a document on behalf of a user associated with the printing apparatus, the at least on job having attached thereto a label adapted for identification, by the printing apparatus, of the user on which behalf the at least one job has been requested;
   receiving the at least one job by the printing apparatus; and
   automatically placing, by the printing apparatus, the at least one job in the queue for automatic printing without user intervention,
   wherein the method further comprises, before the at least one job is automatically printed:
     inputting a user identification by the user at the printing apparatus, and
     identifying the user by the printing apparatus by means of the input user identification based on the label of the at least one job,
     wherein the step of automatically placing includes automatically placing the at least one job at a predetermined location in the queue in order to be automatically printed as a next job.

12. The computer readable medium according to claim 11, wherein the queue contains a plurality of jobs requested on behalf of the user, wherein a group of jobs is selected from the plurality of jobs on the basis of an adjustable selection criterion, the selected jobs being placed at a predetermined location in the queue.

13. The computer readable medium according to claim 12, wherein the selected jobs are formed into a collective job which is placed at a specific location in the queue.

14. The computer readable medium according to claim 13, wherein a job at the head of the queue is executed as a next job, where the collective job is placed at the head of the queue.

15. The computer readable medium according to claim 11, wherein the computer program further comprises computer-executable instructions for:
   inputting the user identification via one of an input keypad and a badge reader.

16. A printing apparatus for making documents, comprising:
   a printing module; and
   a controller configured to
     request at least one job for making a document on behalf of a user associated with the printing apparatus, the at least one job having attached thereto a label adapted for identification, by the printing apparatus, of the user on which behalf the at least one job has been requested,
     receive the at least one job by the printing apparatus, and
     automatically place, by the printing apparatus, the at least one job in the queue for automatic printing without user intervention,
     wherein the controller is further configured to, before the at least one job is automatically printed:
       receive a user identification by the user at the printing apparatus,
       identify the user by the printing apparatus by means of the input user identification based on the label of the at least one job, and
       automatically place the at least one job at a predetermined location in the queue in order to be automatically printed as a next job.

17. The apparatus according to claim 16, wherein the queue contains a plurality of jobs requested on behalf of the user, wherein a group of jobs is selected from the plurality of jobs on the basis of an adjustable selection criterion, the selected jobs being placed at a predetermined location in the queue.

18. The apparatus according to claim 17, wherein the selected jobs are formed into a collective job which is placed at a specific location in the queue.

19. The apparatus according to claim 18, wherein a job at the head of the queue is executed as a next job, where the collective job is placed at the head of the queue.

20. The apparatus according to claim 16, further comprising an image forming device using an ink jet process.

21. The apparatus according to claim 16, further comprising:
one of an input keypad and a badge reader configured to receive the user identification.

* * * * *